United States Patent
Davis et al.

(10) Patent No.: US 8,074,271 B2
(45) Date of Patent: Dec. 6, 2011

(54) METHOD AND APPARATUS FOR MAKING A DECISION ON A CARD

(75) Inventors: Michael L. Davis, Amherst, NY (US);
Robert Wamsley, Golden, CO (US);
Tam Hulusi, Santa Anna, CA (US)

(73) Assignee: Assa Abloy AB (SE)

( * ) Notice: Subject to any disclaimer, the term of this patent is extended or adjusted under 35 U.S.C. 154(b) by 988 days.

(21) Appl. No.: 11/778,145

(22) Filed: Jul. 16, 2007

(65) Prior Publication Data
US 2008/0163361 A1     Jul. 3, 2008

Related U.S. Application Data

(60) Provisional application No. 60/821,897, filed on Aug. 9, 2006.

(51) Int. Cl.
*G06F 7/04* (2006.01)

(52) U.S. Cl. ............... 726/16; 726/20; 713/185

(58) Field of Classification Search .............. None
See application file for complete search history.

(56) References Cited

U.S. PATENT DOCUMENTS

| | | | |
|---|---|---|---|
| 5,204,663 A * | 4/1993 | Lee ........................ 340/5.28 |
| 5,678,200 A | 10/1997 | Levi |
| 5,903,845 A | 5/1999 | Buhrmann et al. |
| 6,216,227 B1 | 4/2001 | Goldstein |
| 6,257,486 B1 * | 7/2001 | Teicher et al. ............ 235/380 |
| 6,374,356 B1 * | 4/2002 | Daigneault et al. ........ 726/20 |
| 6,577,299 B1 | 6/2003 | Schiller et al. |
| 6,668,322 B1 | 12/2003 | Wood et al. |
| 6,719,200 B1 | 4/2004 | Wiebe |
| 6,766,450 B2 | 7/2004 | Micali |
| 6,859,650 B1 | 2/2005 | Ritter |
| 6,895,234 B1 | 5/2005 | Laursen et al. |
| 7,197,767 B2 | 3/2007 | Kusakabe et al. |
| 7,308,254 B1 | 12/2007 | Rissanen |
| 7,363,252 B2 | 4/2008 | Fujimoto |
| 7,376,839 B2 * | 5/2008 | Carta et al. ................. 713/185 |
| 7,600,129 B2 * | 10/2009 | Libin et al. ................ 713/185 |
| 7,716,486 B2 * | 5/2010 | Libin et al. ................ 713/176 |
| 7,730,126 B2 * | 6/2010 | Crawford ................... 709/203 |
| 7,775,429 B2 * | 8/2010 | Radicella et al. ........... 235/380 |

(Continued)

FOREIGN PATENT DOCUMENTS

EP            0829828           3/1998

(Continued)

OTHER PUBLICATIONS

Esato—"Nokia Launches NFC Shell for Mobile Payments" http://www.esato.com/news/article.php/id=436 (Feb. 25, 2005) (3 pages).

(Continued)

*Primary Examiner* — Kaveh Abrishamkar
(74) *Attorney, Agent, or Firm* — Sheridan Ross P.C.

(57) ABSTRACT

Method and devices for making access decisions in a secure access network are provided. The access decisions are made by a portable credential using data and algorithms stored on the credential. Since access decisions are made by the portable credential non-networked hosts or local hosts can be employed that do not necessarily need to be connected to a central access controller or database thereby reducing the cost of building and maintaining the secure access network.

36 Claims, 9 Drawing Sheets

U.S. PATENT DOCUMENTS

| | | |
|---|---|---|
| 2001/0018660 A1 | 8/2001 | Sehr |
| 2003/0023874 A1 | 1/2003 | Prokupets et al. |
| 2004/0050930 A1* | 3/2004 | Rowe .......................... 235/380 |
| 2004/0059590 A1 | 3/2004 | Mercredi et al. |
| 2004/0177270 A1 | 9/2004 | Little et al. |
| 2004/0180646 A1 | 9/2004 | Donley et al. |
| 2005/0033962 A1* | 2/2005 | Libin et al. .................... 713/170 |
| 2005/0149443 A1 | 7/2005 | Torvinen |
| 2006/0052091 A1 | 3/2006 | Onyon et al. |
| 2006/0224901 A1 | 10/2006 | Lowe |

FOREIGN PATENT DOCUMENTS

| | | |
|---|---|---|
| EP | 1103922 | 5/2001 |
| EP | 1628255 | 2/2006 |
| EP | 1841166 | 10/2007 |
| JP | 2002-129792 | 5/2002 |
| WO | WO 02/096070 | 11/2002 |
| WO | WO 03/081934 | 10/2003 |
| WO | 2004/025545 | 3/2004 |
| WO | 2005/024549 | 3/2005 |
| WO | WO 2005/091516 | 9/2005 |
| WO | WO 2005/096651 | 10/2005 |
| WO | WO 2007/139909 | 12/2007 |
| WO | WO 2008/024162 | 2/2008 |
| WO | WO 2008/024320 | 2/2008 |
| WO | WO 2008/035115 | 3/2008 |
| WO | WO 2008/042302 | 4/2008 |

OTHER PUBLICATIONS

Indala—"Product Families" www.indala.com/products/index.html (Copyright 2004) (2 pages).

NFC Forum—"About Near Field Communication" http://www.nfc-forum.org/aboutnfc/ (Copyright 2005) (3 pages).

Nokia—"Use Cases" http://www.nokia.com (Copyright 2005) (2 pages).

Phillips Semiconductoers—"Near Field Communication PN511-Transmision module." (Feb. 2004) (18 pages).

Official Action for Australia Patent Application No. 2007203452, dated May 19, 2011 2 pages.

* cited by examiner

METHOD AND APPARATUS FOR MAKING A DECISION ON A CARD

CROSS REFERENCE TO RELATED APPLICATIONS

This Application claims the benefit of U.S. Provisional Application No. 60/821,897, filed Aug. 9, 2006, the entire disclosure of which is hereby incorporated herein by reference.

FIELD OF THE INVENTION

The present invention relates generally to access control systems, devices, and methods. More specifically, the present invention provides an access control system in which authentication decisions are made on a credential.

BACKGROUND

In prior art access control systems, for example as shown in FIG. 1, typically credentials 120 (or other equivalent tokens) are used to authenticate a user to a system. These systems often employ cryptographic protocols, such as ISO 9798-2, to effect mutual authentication between the system and the card. Access is granted when the system recognizes the user, finds the privileges for the user in a database, and makes the decision based on the user's privileges outlined in the database. In all these prior art systems the credential 120 is primarily an information carrier; little use is made of processing power inherent in the credential 120.

In many prior art systems, the database is centralized. FIG. 1 depicts a centralized access control system 100 with a centralized database 104. The benefit of a centralized database in access control is the ease of data management, speed, and consistency with which data updates are shared in the access control system 100. However, such prior art systems suffer from high installation costs. If the access control decision is made centrally, then the locks and/or access points 108 are networked (either wired or wirelessly) to a central server or control panel 112. This is expensive. In the case of wired networks, there are costs associated with materials and labor because the wiring must be physically installed between all system components. In the case of wireless networks, there are increased costs associated with ensuring reliable and secure communication between all network nodes.

Another drawback of these prior art systems is their reliance on a physically or wirelessly connected network 116. Such reliance can cause service interruptions when the network is not available. Prior art systems typically do not store policy information (i.e., information used to grant or deny access to a credential 120) at access points such as a door. Instead the system operates in reduced-mode when communication is lost. Storing policy information at the door is possible in prior art systems, but at a higher cost due to both equipment and maintenance.

Other prior art systems, such as those found in WO04025545 and U.S. Pat. No. 6,719,200 make authentication checks based on biometric information using a networked connection and a credential 120 or other processor device. In these types of prior art systems, a biometric template is stored on the credential 120 and a second biometric template is created from a biometric scan taken in response to an access request. The second biometric template is stored in a database 104 on the network 116 and sent to the credential 120 upon presentation of the credential 120 to an access reader. These systems use biometrics for authentication that can later lead to a control decision after user rights are checked, but the credential's processor does not make the access control decision. Rather, the credential's processor verifies that the biometric data received from the network database matches biometric data stored on the credential 120 before any further communications are initiated by the credential with a reader for purposes of gaining access. In these systems the reader still makes the ultimate access control decision.

In other prior art systems, policy information from the database 104 is distributed among non-networked locks. In these prior-art systems, the management of the policy information is problematic. Updating the databases may be accomplished by special reprogramming visits by security personnel, but this is expensive in time, especially in a large system having numerous non-networked locks. Alternatively, the lock database is updated via a pseudo-network created on the user cards, such as the one discussed in WO05024549A2. In these systems, datagram networking techniques pass database records from central system to non-networked locks by additional messaging between user card and lock, see for example U.S. Pat. No. 6,766,450. Typically, systems based on this model involve passing a large amount of data between the user card and the lock, which slows the access control process and makes the experience unpleasant for the user, and consumes energy. This can be a serious detriment in the case of battery-powered locks where power consumption is at a premium.

In yet other prior art systems, such as those described in U.S. Pat. No. 6,374,356, the database of policy information for each user is carried on the card itself. For example, if a user is privileged to open a certain subset of doors in the system, then the card holds information to that effect. In these prior art systems, the lock reads the database record from the card, then the lock determines if the user privileges include opening the lock. In large systems, the access control database record may contain a relatively large amount of data that must be passed to the lock. This transfer of data again slows the access control process and consumes energy.

Database management and transmitted policy information described in the prior art are both processes that can consume significant amounts of time and energy. Energy use is an important consideration for applications where the local door device is battery operated.

SUMMARY

In one embodiment, the problem associated with updating disconnected readers is addressed by obviating the need for policy information to be transferred from the credential to the reader. In accordance with at least one embodiment of this invention, the credential holds policy information and the local host transfers information needed to make an access decision to the credential. The credential uses its processor to make the enforcement decision and transfers the decision or results of that decision to the local host.

While embodiments of the invention do not preclude the capability of transmitting identity information from the credential to the reader, some embodiments may provide the additional capability of securely enforcing control policy without disclosing the credential identity. Moreover, embodiments of the present invention can be used with a networked control system or in a distributed control system. Additionally, certain embodiments of the invention offer a cost saving means by making it possible to create an access control system that is expandable with non-networked readers.

It is one objective of the present invention to provide a secure access control system capable of working with non-networked hosts (local hosts), in which a reader of the local host contains no database, and in which a minimal amount of communication is required between the local host and the credential.

Aspects of the invention address technical problems inherent in prior art systems by having the policy information or user privilege data on the credential and the access control decision made using the credential's microprocessor and communicated to an access control device associated with the local host.

In one embodiment, a local host need only authenticate with the credential using an appropriate protocol, which are well known in the prior art, and transmit to the credential an ID and/or functional identification. After mutual authentication, time and date information are passed from the local host to the credential. This represents a relatively small amount of data and is virtually independent of system size. It should be noted that scalability of the system may depend on additional required messaging, such as a Certificate Revocation List (CRL). As can be appreciated by one of skill in the art, CRLs present just one way to invalidate a user. A CRL, can be used if the credential information is digitally signed. More generally, however, a list of revoked credentials may be employed.

According to one embodiment of the present invention, each credential carries unique privilege information for the credential user, which may include a list of local host or door ID numbers, timestamps, access schedule information, security class information, and additional rules or controls relevant to the user's access authorizations. This information might be coded as a list of door ID numbers, or as a set of rules, or in other ways which are well known to those skilled in the art.

In one embodiment, the processor on the credential runs an algorithm, contained on the credential, to determine if the credential holder privileges allow the credential user to open the door or access the asset protected by the local host. If the decision is made that the credential user is granted access, then a secure message is sent to the door or local host requesting the access control device (e.g., a lock) to open.

If the processor on the credential determines that the credential user is not allowed access to the asset, then no further action is required. Alternatively, if a no-access decision by the credential is made, the credential may send a code to the reader, which allows both the reader and credential to record an unauthorized attempt to gain access. The record may be stored at the reader, the credential, or both. This type of information related to an unauthorized access attempt might be useful for later investigation or security analysis.

It is assumed that privileges and algorithms residing on the credential can be periodically and securely maintained by appropriate means, such as connection to or communication with a central database by a credential reader/writer. The reader/writer may be associated with a PC, workstation, or at a networked access-control point. This is preferable of prior art schemes where a database is updated periodically on the reader, because the reader is typically stationary and may be remote, whereas the credential is mobile and typically carried by the user wherever lie might require to use it. The credential can therefore be brought to the reader/writer rather than bringing the reader/writer to all local hosts.

Expiration of the privileges on the credential (e.g., to prevent unauthorized use of a lost or misplaced credential) may be enforced by time-stamping the privileges on the credential, or by other known mechanisms. In any case, the processor on the credential may still make the access control decision by running an algorithm.

In one embodiment, the access control system comprises one or more non-networked door locks otherwise known as local hosts, one or more credentials, one or more credential reader/writers, and a central access control system including a master database and system administrator interface.

The local host, in one embodiment, comprises an access control device and a controller. The controller preferably utilizes a microprocessor, a random number generator or alternatively a secure seed and a pseudo-random number generator, a cryptographic coprocessor, and control circuitry to operate the blocking mechanism (e.g., a lock, password protection program, or the like). The local host may further include a power source such as a battery or a solar cell, volatile and nonvolatile memory, a real-time clock, and a Radio Frequency Identification (RFID) reader or other communication mechanism.

The credential, in one embodiment, comprises a communication mechanism, for example, either an RFID antenna or electrical contacts typical to a contact credential 216, and a smartcard controller. The credential 216 controller generally comprises a microprocessor, RFID or other communications circuitry, a random number generator, a cryptographic coprocessor, and volatile and non-volatile memory. Preferably the memory and circuitry of the credential and the local host are designed utilizing security features to prevent unauthorized access to the memory contents, side channel analysis, and the like.

In a transaction, the reader of the local host supplies its ID and current date and time information to the credential. The credential contains access privilege data, normally specific to the credential holder. Based on the ID and time, coupled with the privileges data, the credential decides if the credential holder may access the asset protected by the local host.

In one embodiment, if access is granted, then the credential issues a secure "unlock request" to the local host. If access is not granted, then no action need be performed. As can be appreciated, a system based on embodiments of this invention can be made secure against playback and other simple attacks by employing suitable cryptographic techniques in authentication and messaging.

The Summary is neither intended or should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

Embodiments of the present invention are directed toward devices and methods of using such devices in a secure access system. Although well suited for use in systems and methods employing RF communication protocols, embodiments of the present invention may be suitable for use in systems employing other communication protocols including, but not limited to, optical communication protocols, magnetic communication protocols, and the like.

Figure 1:
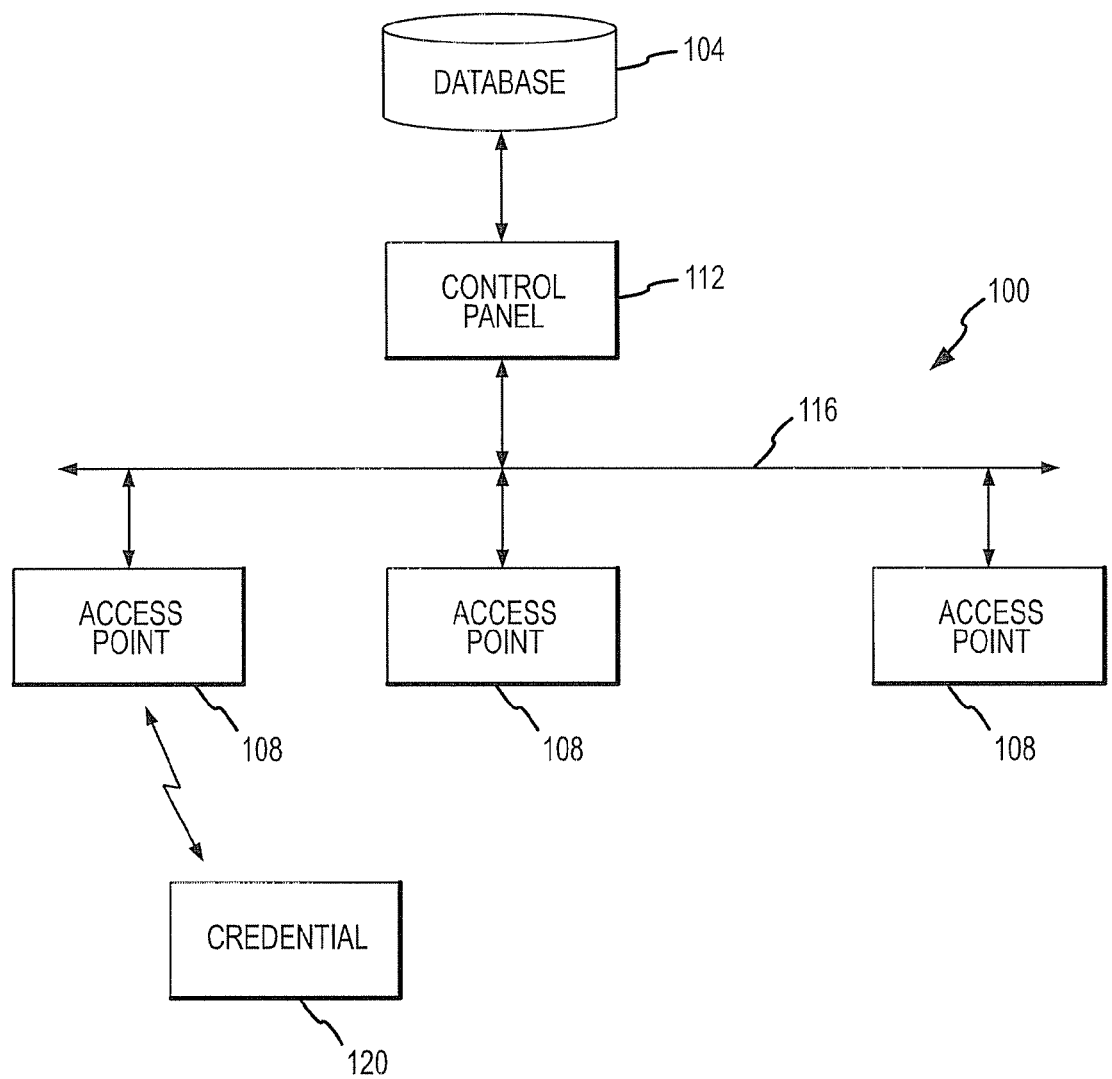
FIG. 1 depicts a centralized access control system in accordance with embodiments of the prior art.
Figure 2:
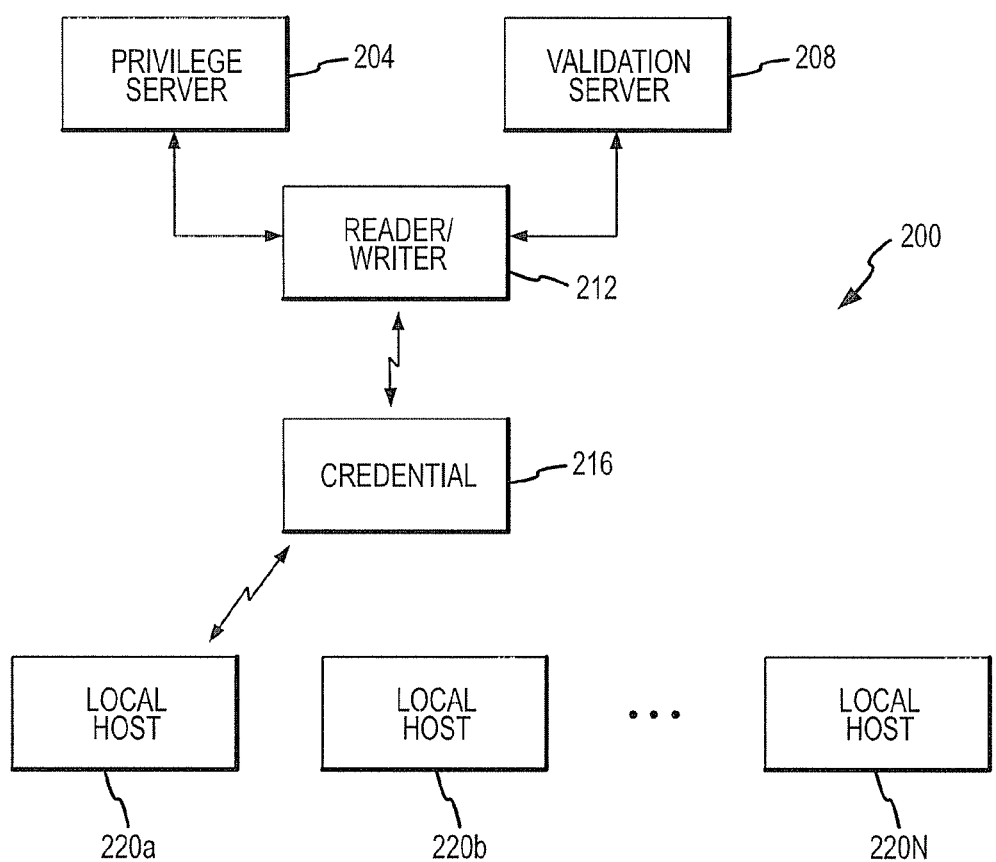
FIG. 2 depicts an access control system in accordance with embodiments of the present invention.

FIG. 2 depicts a secure access system 200 in accordance with at least some embodiments of the present invention. The secure access system 200 generally includes a privilege server 204 and a validation server 208 that communicate with one or more credentials 216 through a reader/writer 212. The privilege server 204 and validation server 208 are dedicated servers that provide certain services to credentials 216 in the system 200. Although depicted separately, a single server or similar device may execute the functionality of both the privilege server 204 and the validation server 208. The privilege server 204 and/or validation server 208 are capable of communicating with the reader/writer 212 via any known communication protocol such as Internet Protocol (IP) standard or the like.

The privilege server 204 initializes, modifies, and changes applications and application data stored on a credential 216 by using the writing feature of the reader/writer 212. The privilege server 204 can increase or decrease the scope of the privileges associated with the credential. The privilege server 204 has access to a user database that identifies what access permissions various users in the system 200 have. When a credential 216 is presented to the reader/writer 212, the privilege server 204 accesses data on the credential 216 using a symmetric key, Kp, that is shared between the privilege server 204 and the credential 216. Of course, the key, Kp, may also be an asymmetric key or other type of secret. Then the privilege server 204 can identify who the holder of the credential 216 is or is supposed to be. Once the privilege server 204 knows the identity of the holder it can generate the appropriate access permissions and write those permissions to the credential 216 in the form of application data. Additionally, the privilege server 204 can write an application to the credential 216 that is used by the credential 216 to make access decisions based, in part, on the application data. The privilege server 204 stores application data that includes, but is not limited to, schedule data (i.e., access permissions data by time), local host data (i.e., access permissions by local host), timestamp data, and authentication keys for each credential 216 in the population of credentials 216 in the access control system 200. The application data for each credential 216 may be stored in a portion of memory in the privilege server 204 or in a separate database. The privilege server 204 also has access to the current time either by an Internet connection, an internal clock, or by some other mechanism.

The validation server 208 is provided to refresh the application on a credential 216 with a privilege expiration, typically in the form of a timestamp. The validation server 208 does not increase the scope of the privileges associated with a credential, other than by extending the time existing credentials are valid. The validation server 208 has access to the current time. The validation server 208 also has access to the current validation status of all access control privileges for every credential holder. Validation status information may be stored either in memory of the validation server 208 or in an external database. When a credential 216 is presented to the reader/writer 212, the validation server 208 determines if the credential's status is still active and also determines if the schedule data on the credential 216 is current. If both are true, then the validation server 208 sets a new expiration for the application data on the credential 216. Of course, the validation server 208 does not have to set a new expiration if current data is not expired. Otherwise, the application data is left alone such that it either remains expired or will expire after a predetermined expiration period, or may renew it, even if expired if such instructions are in the system.

The reader/writer 212 acts as a communication conduit between the credential 216, privilege server 204, and validation server 208. As can be appreciated, a separate and dedicated reader/writer 212 may be provided for both the privilege server 204 and the validation server 208. Additionally, the reader/writer 212 may also be a networked reader/writer 212 associated with an access point in the access control system 200. A networked reader/writer 212 may read and perform authentication with the credential 216 and then act as a communication conduit between the credential 216 and the validation server 208. The system may also be a single server with both the privilege and validation functionality working through a single reader/writer. There may also be multiple reader/writers connected in a network at different locations to permit credentials to be updated or validated at physically different locations but under the control of a single administrative system.

The credential 216 may be any suitable type of access control device. In one embodiment, the credential 216 is capable of making real-time or near real-time access decisions. In other words, the credential 216 is capable of determining whether it is granted or denied access to various assets in the secure access system 200. The credential 216 stores application data that includes access permissions and algorithms for making access decisions. The credential 216 may be provided with a unique ID that distinguishes it over other credentials 216 in the population of credentials 216. In one embodiment, the credential ID, application data, and other data stored on the credential 216 is protected using various symmetric keys. The credential 216 generally includes an RF transponder that enables the credential 216 to communicate using contactless communication protocols. Examples of a suitable credential 216 include, but are not limited to, a contactless smartcard, a passport, a key fob, a cellular phone, a PDA, portable computer, or any other device having appropriate functionality. Alternatively, the credential 216 may be in some other machine-readable form. For example, the credential 216 may employ magnetic, optical, or contact communication methods.

Using any type of communication protocol, the credential 216 is capable of communicating with a local host 220a-N. A local host 220 is any type of non-networked access point. The local host 220 controls access to one or more assets such as a building, room, computer, database, file, and so on. The local host 220 is typically assigned a unique ID that identifies the host or the asset protected by the host. In one embodiment, the host ID is passed to the credential 216 in order for the credential 216 to have enough information to make an access decision. In a preferred embodiment, the local host 220 only needs to supply its host ID and the current time to the credential 216.

Figure 3:
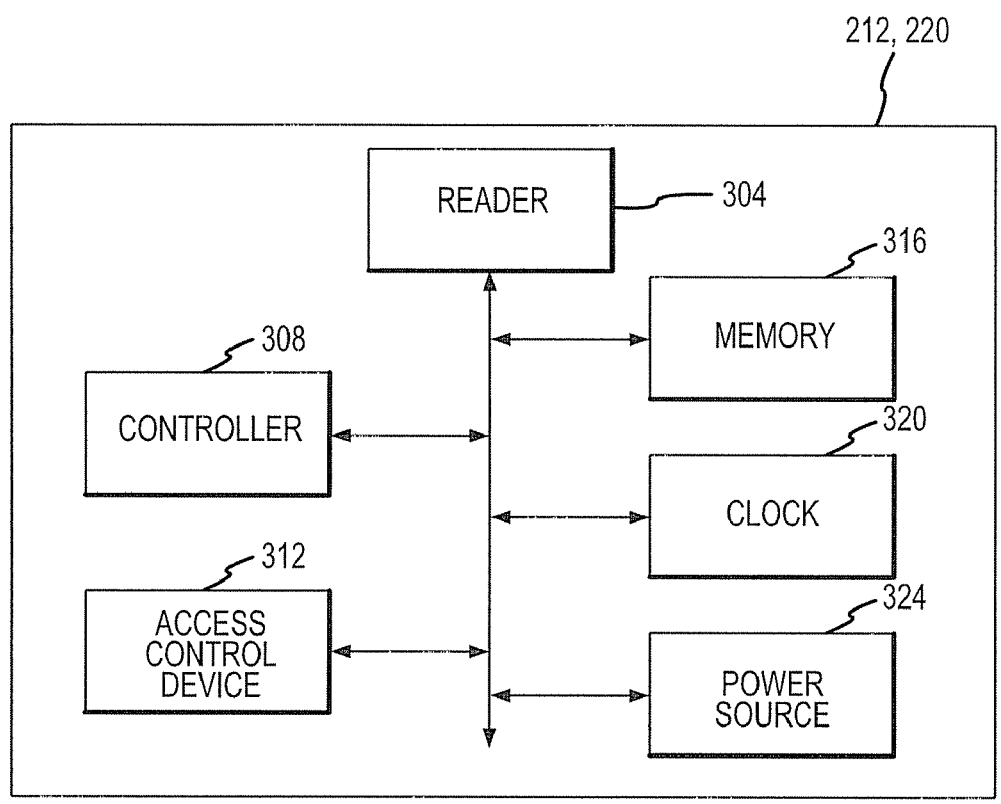
FIG. 3 depicts components of a local host in accordance with embodiments of the present invention.

Referring now to FIG. 3, an exemplary reader/writer 212 or local host 220 will be described in accordance with at least some embodiments of the present invention. The reader/writer 212 or local host 220 generally comprises a reader 304 capable of automatically reading data from a credential 216. The reader 304 may also be capable of writing data back to the credential 216. The reader 304, in one embodiment, comprises an RF antenna used to communicate back and forth with the credential 216.

Connected to the reader 304 is a controller 308. In one embodiment, the controller 308 includes a microprocessor, a random number generator, and a cryptographic coprocessor. The controller 308 is capable of properly modulating/demodulating data sent to and received from external devices such as the credential 216. The controller 308 controls and determines how the reader/writer 212 or local host 220 behaves when a credential 216 is presented to it. The controller 308 may include any general-purpose programmable processor, digital signal processor (DSP) or controller for executing application programming. Alternatively, the controller 308 may comprise a specially configured application specific integrated circuit (ASIC).

The controller 308 may also be provided with control circuitry capable of manipulating an access control device 312. The access control device 312 is designed to secure the asset being protected by the reader/writer 212 or local host 220. Examples of a typical access control device 312 include, without limitation, an electronic lock, a magnetic lock, or an electric strike for a door, a lock for a computer system, a lock for a database, a lock on a financial account, or a lock on a computer application. In one embodiment, the controller 308 actuates the access control device 312 based on results of an access decision provided to the controller 308 from the credential 216. The access control device 312 may be integral to the reader/writer 212 or local host 220 in one embodiment. In an alternative embodiment, access control device 312 is external to the reader/writer 212 or local host 220.

In addition to an access control device 312, the reader/writer 212 or local host 220 may further comprise a memory 316. The memory 316 may be used to store application data, the host unique ID, and any other functions that can be executed by the controller 308. The memory 316 may comprise volatile and/or non-volatile memory. Examples of non-volatile memory include Read Only Memory (ROM), Erasable Programmable ROM (EPROM), Electronically Erasable PROM (EEPROM), Flash memory, and the like. Examples of volatile memory include Random Access Memory (RAM), Dynamic RAM (DRAM), Static RAM (SRAM), or buffer memory. In one embodiment, the memory 316 and the controller 308 is designed to utilize known security features to prevent unauthorized access to tire contents of the memory 316 such as side channel analysis and the like.

The reader/writer 212 or local host 220 may further comprise a clock 320. The clock 320 is depicted as internal to the reader/writer 212 or local host 220, but the clock may also be external to the reader/writer 212 or local host 220. The clock 320 tracks the current time. The controller 308 can read the time from the clock 320 and provide that time to a credential 216. The credential 216 uses the time from the clock 320 to determine if the holder of the credential 216 is currently allowed access to an asset protected by the access control device 312.

A power source 324 may also be included in the reader/writer 212 or local host 220 to provide power to the various devices contained within the reader/writer 212 or local host 220. The power source 324 may comprise internal batteries and/or an AC-DC converter such as a switch mode power supply or voltage regulator connected to an external AC power source.

Although not depicted, a reader/writer 212 may further include a communication interface that provides communication capabilities between the reader/writer 212 and external servers or other network nodes. Such a communication interface may include a USB port, a modem, a network adapter such as an Ethernet card, or any other communication adapter known in the art.

Figure 4:
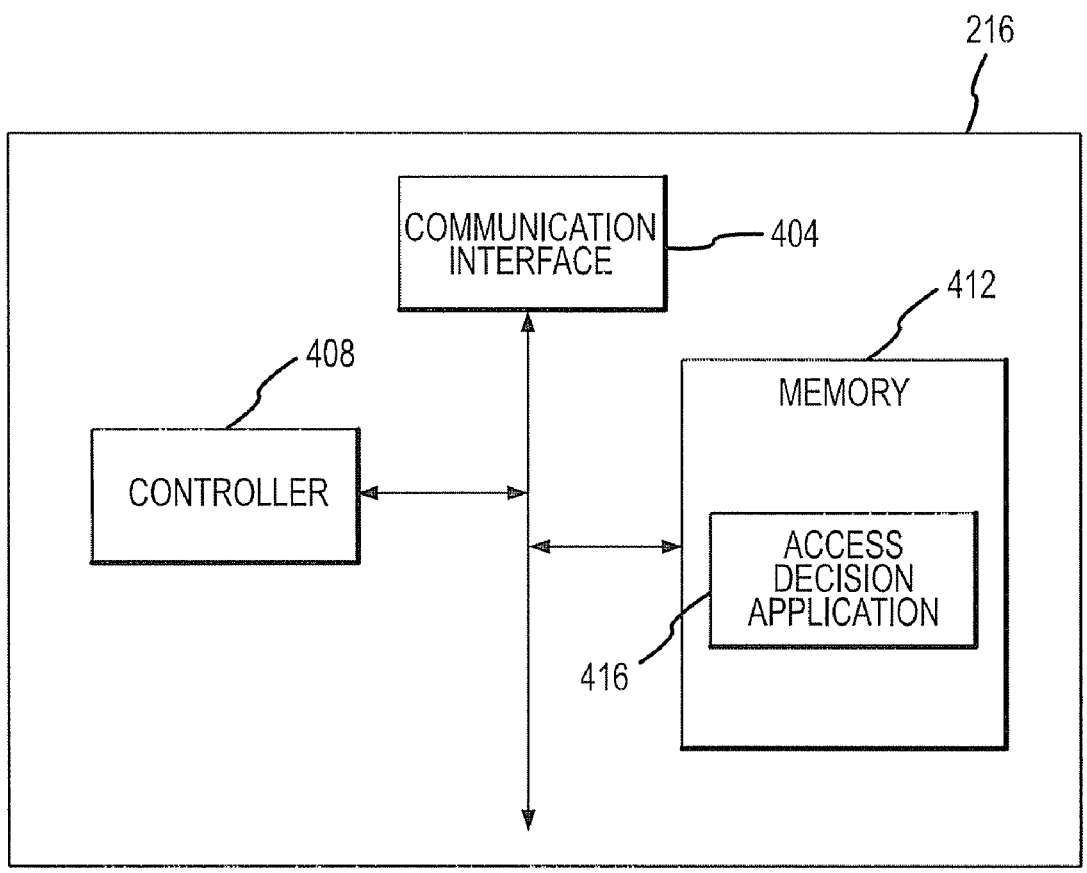
FIG. 4 depicts components of a credential in accordance with embodiments of the present invention.

Referring now to FIG. 4, an exemplary credential 216 will be described in accordance with at least some embodiments of the present invention. The credential 216 may include a communication interface 404 that allows the credential 216 to communicate with external devices such as the reader/writer 212 or local host 220. The communication interface 404 may comprise an RF antenna that allows the credential 216 to receive and transmit data without contact. In other embodiments a magnetic, optical, or electrical contact communication interface 404 may be utilized.

A controller 408 may be connected to the communication interface 404. The controller 404, in one embodiment, includes a microprocessor, a random number generator, and a cryptographic coprocessor. The controller 408 may include any general-purpose programmable processor, digital signal processor (DSP) or controller for executing application programming. Alternatively, the controller 408 may comprise a specially configured application specific integrated circuit (ASIC). Similar to the controller 308 on the reader/writer 212 or local host 220, the controller 408 includes known security features that substantially prevent unauthorized access to the contents of memory 412.

The memory 412 typically comprises non-volatile memory, such as flash memory. Non-volatile memory is generally used because the credential 216 is preferably a passive credential meaning that it does not have an internal source of power. Rather, the credential 216 uses energy from an RF field created by the reader/writer 212 or local host 220 to power its components. Contents of the memory 412 may include an access decision application 416. As noted above, the privilege server 204 may write the access decision application 416 along with application data to the credential 216. In a preferred embodiment, the access decision application 416 and application data are written to the credential 216 in a secure environment. The access decision application 416 contains an algorithm or algorithms that can be used to make an access decision. The controller 408 can access the access decision application 416 and application data to make an access decision with respect to a particular reader/writer 212 or local host 220.

In an alternative embodiment the credential 216 may be provided with an onboard power supply. Such credentials 216 are known as active credentials 216. An active credential 216 can keep its own trusted time that can be synchronized with the network devices during interactions with the privilege server 204 and/or validation server 208.

Figure 5:
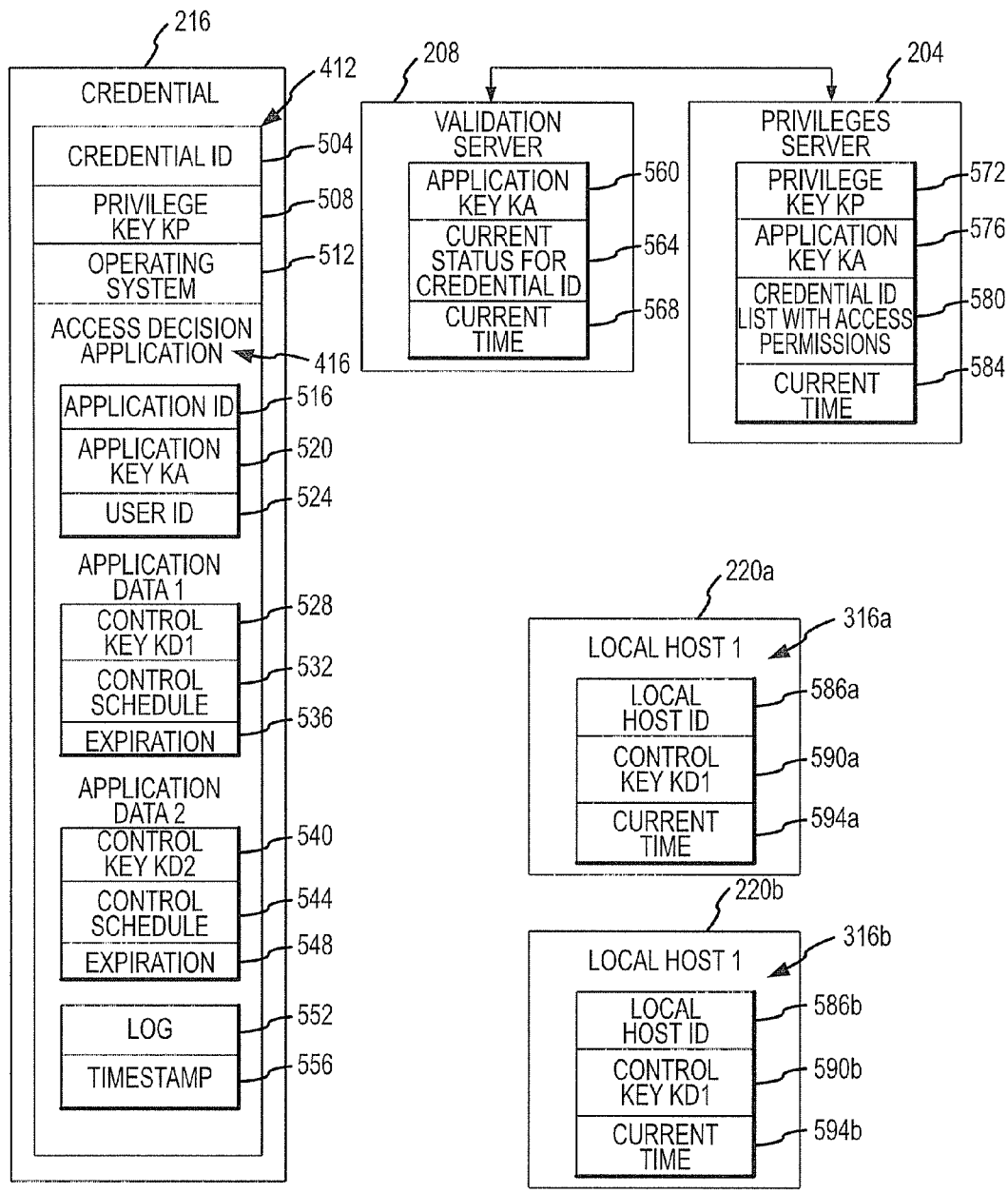
FIG. 5 depicts logical data components of the access control system in accordance with embodiments of the present invention.

FIG. 5 depicts logical components of each device in the secure access system 200 in accordance with at least some embodiments of the present invention. The memory 412 of the credential 216 generally contains application data and an access decision application 416. The memory 412 may also include credential specific data such as a credential ID 504 and a privilege key Kp 508. The memory 412 may also include an operating system 512 that defines the normal functionality of the credential 216.

The access decision application 416 is a second program or algorithm that may be stored on the memory 412. The access decision application 416 may be given a unique Application ID 516 that distinguishes this application from other applications, such as the operating system 512, that are stored in memory 412. A symmetric application key Ka 520 is also stored in memory 412. The application key Ka protects access to the application data. The application key Ka may be shared upon initialization of the system or creation of the application with the validation server 208. The application key Ka 520 is typically different from the privilege key Kp used by the privilege server 204 to access and rewrite the entire access decision application 416. The application key Ka 520 is required to update or modify the expiration of the access decision application 416. Also stored in the memory 412 in association with the access decision application is a user ID 524. The user ID 524 identifies the intended user of the credential 216. The user ID 524 may be an arbitrary identifier such as a randomly assigned number or may be the user's social security number, employee number, or the like. The user of the credential 216 is assigned the user ID 524 for use with the access decision application 416. The user ID 524 is employed by the privilege server 204 to assign user access permissions and by the validation server 208 to update access permissions. The user ID 524 is generally not needed for use with a local host 220.

As previously noted, application data may be stored as a part of the access decision application 416. A set of application data is substantially unique to a particular application and therefore is substantially unique to certain local hosts 220. For example, a first set of application data may be used to make access decisions for rooms in a building. A second set of application data may be used to make access decisions for a garage door or the like whereas a third set of application data may be used to make access decisions related to electronic files or programs.

In one embodiment, a first set of application data includes a control key KD1 528, a control or access schedule 532, and an expiration time 536. The control key KD1 528 is shared with the local host(s) 220 that will be used in association with the first application. The control key KD1 528 is used by the local host 220 and credential 216 to authenticate with one another. The control schedule 532 is a logical combination of the credential's 216 access permissions by time as well as the credential's 216 access permission by local host 220. The access decision application 416 uses the control schedule 532 to determine if access should be granted or denied for the holder of the credential 216 with respect to a particular reader/writer 212 or local host 220. The expiration 536 controls the useful life of the application data and is generally only updated by the validation server 208. If the expiration 536 has lapsed or expired then the control schedule 532 is rendered invalid until it is presented to a validation server 208 and the expiration 536 is updated again. The credential 216 will be incapable of making an access decision for any local host in the first application if the expiration 536 for that application has caused the control schedule 532 to be rendered invalid.

More than one set of application data may be stored in the access decision application 416. A second set of application data may include a control key KD2 540, a control schedule 544, and an expiration 548. The second set of application data is substantially unique to the second application and thus preferably runs the second application independent of the first application. For example, the lapse of the first expiration 536 does not necessarily mean that the second expiration 548 has lapsed.

Although two application data blocks are depicted in FIG. 5, one skilled in the art will appreciate that a lesser or greater number of application data blocks may reside on the credential 216. In one embodiment, there may be a different application data block for each local host 220 in the secure access system 200.

In addition to application data, the access decision application 416 may also store access history in a log file 552. The log file 552 contains data related to access decisions made by the credential 216. Both access granted decisions and access denial decisions along with the corresponding time of decision and reader/writer 212 or local host 220 are stored in the log file 552. The log file 552 can be accessed to determine the whereabouts and actions of the holder of the credential 216.

A timestamp 556 may also be stored as a part of the access decision application 416. The timestamp 556 represents the most recent time that the credential 216 was accessed by a reader/writer 212 or local host 220. Comparison of the timestamp 556 and expiration 536, 548 may determine whether a particular application should be rendered invalid by deactivating the control schedule 532, 544.

The privilege server 204 generally stores data for managing the privileges of the population of credentials 216. The type of data available to the privilege server 204 for each credential 216 in the population of credentials 216 may include a privilege key Kp 572, an application key Ka 576, a credential ID list with access permissions data 580, and the current time 584. The data for all credentials 216 may be stored in a separate database that can be accessed by the privilege server 204. The privilege server 204 identifies a particular credential 216 and pulls relevant data for that credential 216 into the fields described above using the privilege key Kp 572. The privilege server 204 employs the application key Ka 576 to authenticate with the credential 216. Once the privilege server 204 is authenticated using the application key Ka 576, the privilege server 204 can modify the access decision application 416 and any application data associated therewith.

The use of the keys Kp 572 and Ka 576 may involve the transmission of an encrypted random or pseudorandom message. The privilege server 204 typically has a random number generator and in the event that the credential 216 does not have a random number generator, the privilege server 204 can provide the random message for the credential 216 to use in authentication.

As noted above, once the privilege server 204 has identified the credential 216 and has pulled the relevant access permissions data 580, the privilege server 204 can write or modify the access decision application 416 along with the current time 584. The current time 584 may be stored by the credential 216 as the timestamp 556.

The validation server 208 generally stores data for managing the expiration of application data on credentials 216. The type of data available to the validation server 208 for each credential 216 in the population of credentials 216 may include an application key Ka 560, a credential status 564, and the current time 568. The validation server 208 employs the credential status 564 data to determine if the credential's 216 expirations 536, 548 should be updated or removed. The current time from the validation server 208 may also be written to the timestamp 556 data field in the access decision application 416.

Each local host 220a-N may store unique data to the host or the application employed by the host in their respective memories 316a-N. The type of data stored in a local host 220 may include a local host ID 586, a control key KD1 590, and the current time 594. The control key KD1 590 is used to authenticate with a credential 216 and more specifically to authenticate with a particular set of application data stored in the application decision application 416. Once authenticated, the local host ID 586 and current time 594 are provided to the credential 216 such that an access decision can be made by the credential 216.

Figure 6:
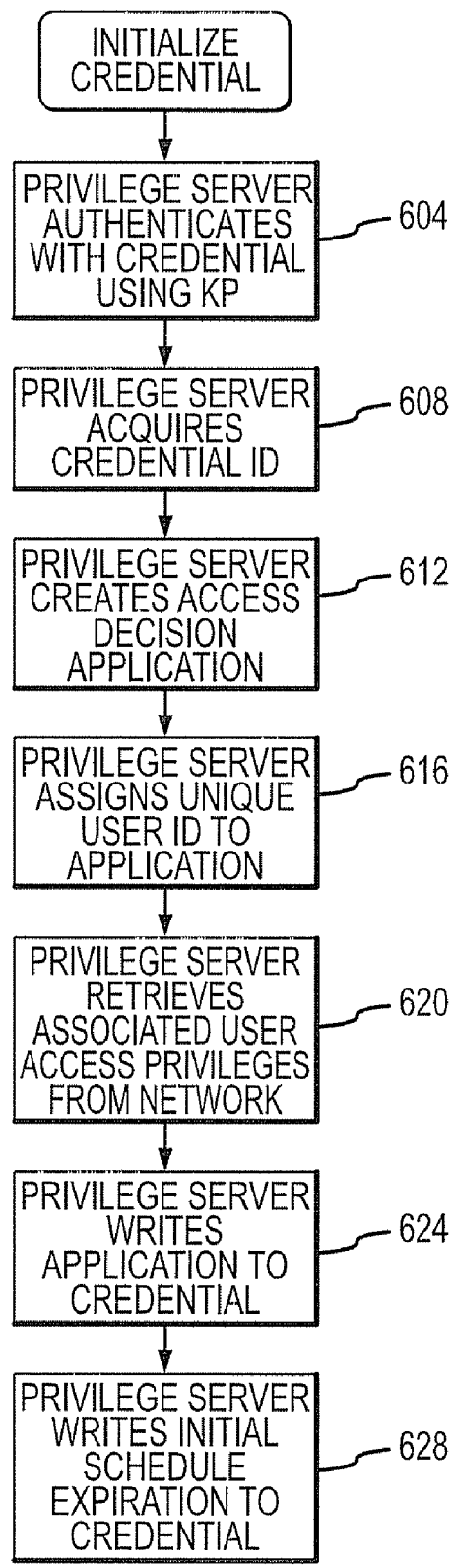
FIG. 6 depicts a method of initializing a credential with access data in accordance with embodiments of the present invention.

Referring now to FIG. 6, a method of initializing a credential 216 will be described in accordance with at least some embodiments of the present invention. Initially, the method begins with the privilege server 204 authenticating with the credential 216 (step 604). The privilege server 204 uses its privilege key Kp 572 and the credential 216 uses its privilege key Kp 508 to authenticate with one another. As noted above, the authentication step may involve the transmission of an encrypted random message between the credential 216 and privilege server 204.

Once the privilege server 204 and credential 216 are properly authenticated, the privilege server 204 acquires the credential ID 504 from the credential 216 (step 608). The privilege server 204 references a credential database with the credential ID 504 to eventually pull the access permissions for the particular credential 216 (or holder of the credential 216) presented to the privilege server 204. The privilege server 204 then creates the access decision application 416 (step 612). The access decision application 416 includes at least one set of application data. More sets of application data may be included in the access decision application 416 if more than one application is to be run by the same credential 216.

After the access decision application 416 has been created, the privilege server 204 assigns a unique user ID 524 to the application (step 616). Other devices in the network 200 will ultimately use the unique user ID 524 to determine if the application 416 is still valid. The privilege server 204 then retrieves the associated user access permissions data 580 from the network using the credential ID 504 (step 620). The user access permissions data 580 define what reader/writers 212 or local hosts 220 the user is allowed to access and the times the user is allowed to access them. This user access permissions data 580 along with the user ID 524 is written to the credential 216 as a part of the access decision application 416 (step 624).

Upon writing the application to the card, or soon thereafter, the privilege server 204 also writes expirations 536, 548 for each set of application data included in the access decision application (step 628). The expirations 536, 548 can be a timing based instruction to either delete a particular set of application data or render the corresponding control schedule 532 invalid and thus unusable. After a set of application data has expired, the credential 216 will need to be presented to a reader/writer 212 such that either a privilege server 204 or validation server 208 can update the expirations 536, 548. Alternatively, the expirations 536, 548 may be valid and can remain unchanged. It should be noted that separate access decision applications for separate application data may be sequentially or simultaneously created.

Figure 7:
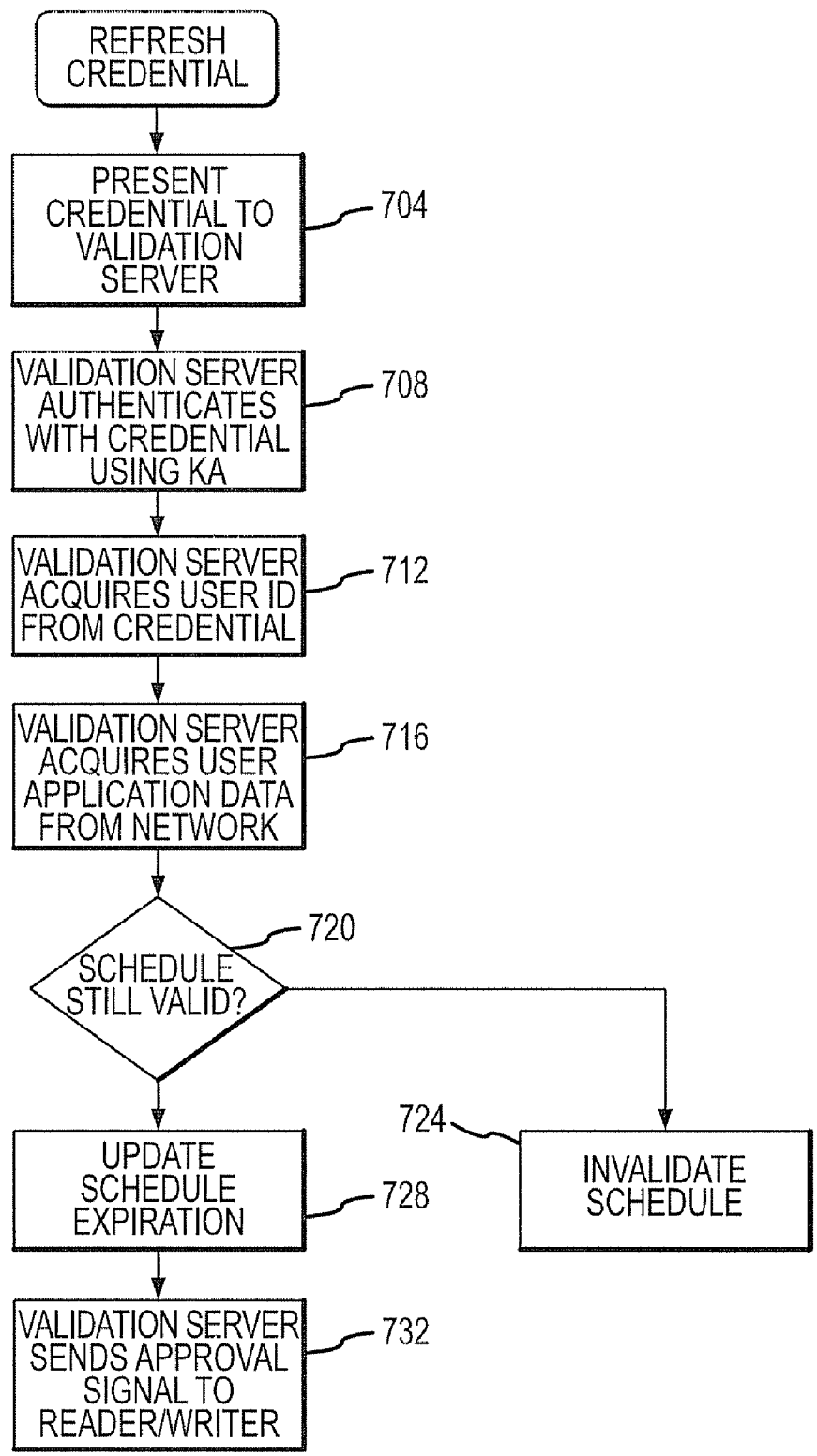
FIG. 7 depicts a method of refreshing access information on a credential in accordance with embodiments of the present invention.

Referring now to FIG. 7, a method of refreshing an access decision application 416 will be described in accordance with at least some embodiments of the present invention. Initially, a credential 216 is presented to the validation server 208 (step 704). The presentation of the credential 216 to the validation server 208 may be through a communication conduit provided by a reader/writer 212. Upon presentation of the credential 216 to the validation server 208, authentication between the credential 216 and the validation server 208 occurs (step 708). The credential 216 uses application key Ka 520 to authenticate with the validation server 208 and the validation server 208 uses application key Ka 560 to authenticate with the credential 216. The application keys Ka 520, 560 are shared symmetric keys unique to the access decision application 416. The authentication step helps ensure that both devices know they are communicating with a valid device.

After mutual authentication, the validation server 208 acquires the user ID 524 from the credential 216 (step 712). Using the user ID 524, the validation server 208 acquires the application data for the presented credential 216 or holder of the credential 216 (step 716). The application data for the presented credential 216 can be obtained from periodic updates of the user's application data from the privilege server 204 or by accessing the privilege server 204 in realtime. The validation server 208 then analyzes the application data for the presented credential 216 to determine if the access permissions for that credential 216 are still valid (step 720). In the event that the access permissions are no longer valid, then the validation server 208 invalidates the control schedule(s) 532, 544 that were identified as inactive (step 724). Access permissions may become invalid for a number of reasons. For example, the holder of the credential 216 may have been terminated or had his/her permissions changed and therefore the application data stored on the credential 216 is out no longer valid. Alternatively, the access permissions may require updating and the application data has not been updated within the predetermined time.

The control schedule 532, 544 can be invalidated by executing the expiration function 536, 548 corresponding to the inactive control schedule 532, 544. Alternatively, access to the control schedule 532, 544 can be restricted thus inhibiting the credential 216 from making an access decision. In one embodiment, a control schedule 532, 544 is marked invalid by setting the timestamp to all zeros. In another embodiment control schedules 532, 544 are marked invalid by setting the expiration to a time in the past or to a different prescribed invalid code.

In the event that the access permissions are still valid, the method continues and the validation server 208 updates the schedule expiration 536, 548 if appropriate or necessary (step 728). The expiration 536, 548 may be updated both in the network as well as the credential 216. The reader/writer 212 may be used to write the updated expiration 536, 548 to the credential 216. Updating the expiration 536, 548 may include adding additional time to the expiration counter or changing the expiration date.

Once the expiration 536, 548 has been updated, the validation server 208 sends an approval signal back to the reader/writer 212 (step 732). The reader/writer 212 may then grant the holder of the credential 216 access to the asset protected by the reader/writer 212. Alternatively, a light or similar type of indicator may be activated showing the credential 216 holder that the expiration 536, 548 has been successfully updated.

Figure 8:
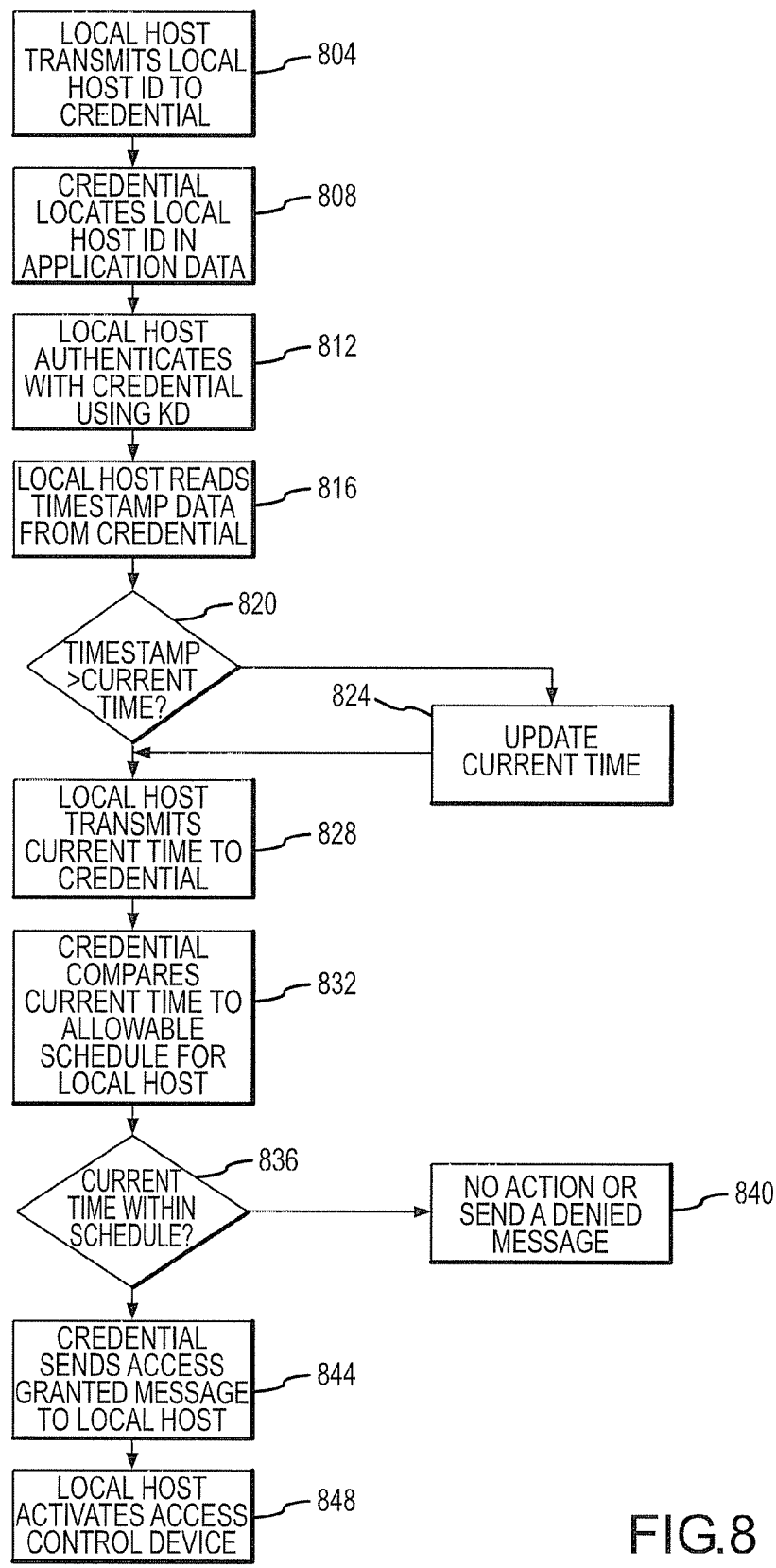
FIG. 8 depicts a method of operating a local host in accordance with embodiments of the present invention.

With reference now to FIG. 8, a method of operating a local host 220 will be described in accordance with at least some embodiments of the present invention. Initially, when a credential 216 is presented to a local host 220, the local host 220 transmits its local host ID 586 to the credential 216 (step 804). The local host ID 586 uniquely identifies the local host 220 or the application employed by the local host 220 to the credential 216. Upon receipt of the local host ID 586, the credential 216 locates the local host ID 586 in its application data 416 (step 808). More specifically, the credential 216 identifies that the local host ID 586 is being used in connection with the access decision application 416 and the control schedules 532, 544 of each set of application data is searched for a matching local host ID 586. When the local host ID 586 is found, the control key KD 528, 540 is pulled from the corresponding set of application data. The chosen control key KD 528, 540 is used by the credential 216 to authenticate with the local host 220 (step 812).

After the credential 216 and local host 220 have mutually authenticated with one another, the local host 220 reads the timestamp data 556 from the credential 216 (step 816). The local host 220 uses the timestamp 556 to determine if its own current time 594 is way off from the actual time (assuming the timestamp 556 accurately reflects actual time). The local host 220 can use the timestamp 556 to perform an option step where the local host 220 checks to see if the timestamp 556 is greater than the current time 594 (step 820). The optional step 820 is provided as a check to ensure that the local host 220 clock is not running too slow. In the event that the timestamp 556 is greater than the current time 594, then the local host 220 updates its current time 594. The assumption behind the local host 220 updating its time to match the time from the timestamp 556 is because the credential 216 is able to communicate with networked devices such as a reader/writer 212 that receive their current time from a live and presumably more accurate source such as the Internet. Therefore, the credential 216 timestamp 556 can be updated whenever it is presented to a networked device.

Once the current time 594 is updated or determined to be accurate, the local host 220 transmits the current time 594 to the credential 216 (step 828). The credential 216 then uses the access decision application 416 to compare the received current time against the control schedule 532, 544 for the appropriate application (step 832). After running the access decision application 416 the credential 216 determines whether it is allowed to access the asset protected by the local host 220. In other words, the access decision application 416 determines whether the current time 594 is within the control schedule 532, 544 for the asset associated with the local host (step 836). In other words, the access decision application 416 may determine if access is granted to the local host 220 as well as specify that access is currently allowed for the local host 220 to which the credential 216 is presented. If the current time is not within the control schedule 532, 544 (i.e., the credential 216 is not allowed access to the asset), then no action is performed or the credential 216 sends a denied access message to the local host 220 (step 840). On the other hand, if the credential 216 determines that it should be allowed access to the asset based on the analysis of the control schedule 532, 544, then the credential 216 sends an access granted message to the local host 220 (step 844). Upon receipt of the access granted message, the local host 220 activates an access control device 312 permitting the holder of the credential 216 to access the asset (step 848). The activation of the access control device 312 may include unlocking a lock, releasing a latch, or permitting access to a financial or electronic file.

Figure 9:
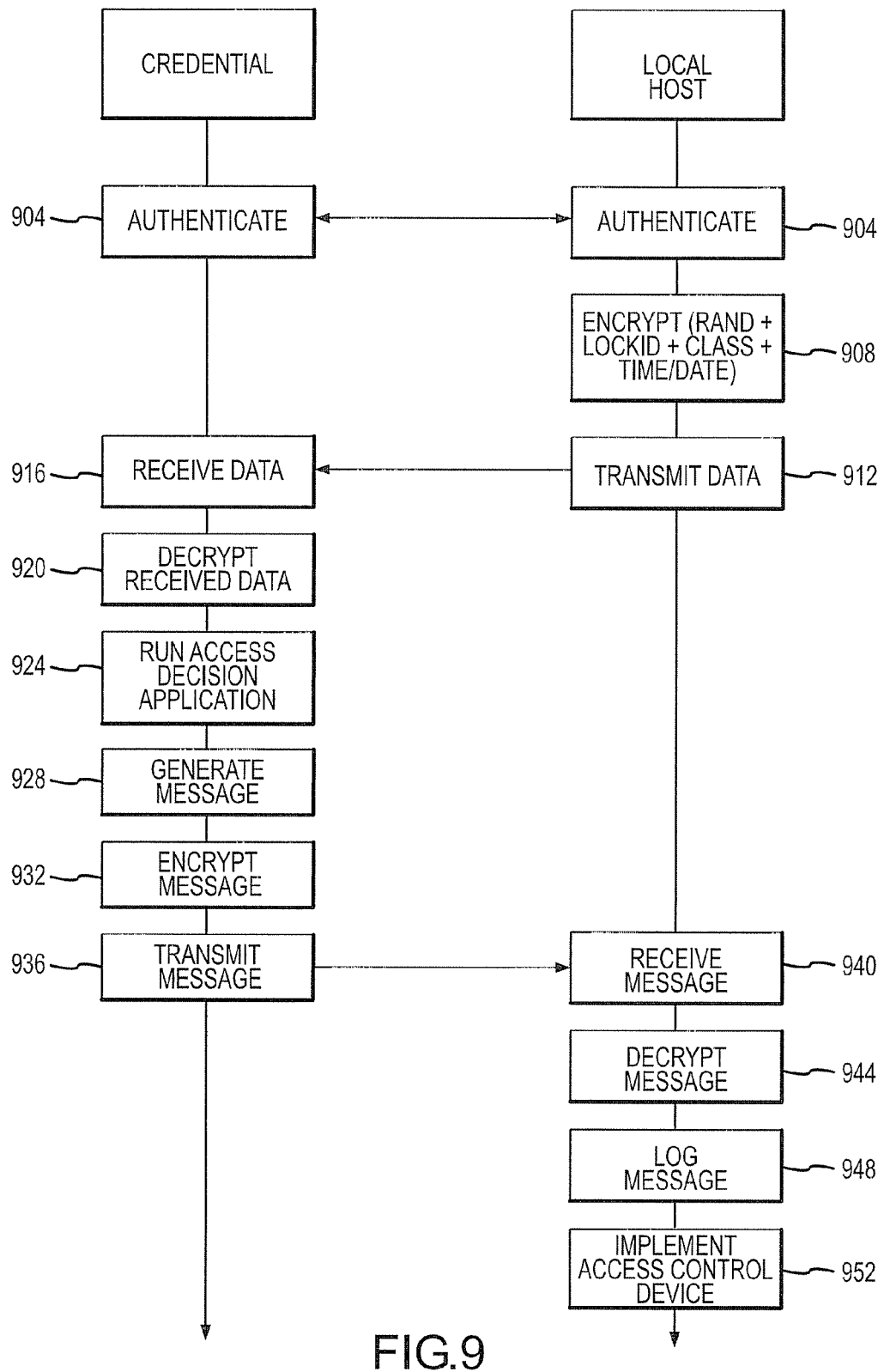
FIG. 9 depicts a method of authenticating a credential with local host in accordance with embodiments of the present invention.

FIG. 9 depicts a communications diagram between a credential 216 and a local host 220 in accordance with at least some embodiments of the present invention. Initially, the credential 216 and local host 220 mutually authenticate with one another (step 904). After mutual authentication has occurred, the local host 220 encrypts a number of different pieces of data together into a message (step 908). The encrypted data may include a random number (Rand), the local host ID 586 (LockID), and current time information. After the message and its contents are properly encrypted, the local host 220 transmits the encrypted message (step 912).

In step 916, the encrypted message is received by the credential 216. After the credential 216 receives the encrypted message it passes the message to the controller 408 where the message is decrypted (step 920). Any known type of encryption/decryption scheme, whether symmetric or asymmetric, may be employed to protect the message during transmission.

After the message has been decrypted, the controller 408 runs the appropriate access decision application 416 (step 924), as the memory may contain multiple access decision applications. Part of running the access decision application 416 generally includes making an access decision and generating a message consistent with the decision (step 928). For example, if an access granted decision is made by the credential 216, then a grant access message is generated. Alternatively, if an access denied decision is made by the credential 216, then a deny access message is generated. The controller 408 then encrypts the contents of the message according to either the same encryption protocol that was employed by the local host 220 or a different encryption protocol (step 932). Thereafter, the controller 408 sends the encrypted message to the communication interface 404 for transmission (step 936).

The message transmitted by the credential 216 is subsequently received by the local host 220 (step 940). After the message is received, the controller 308 decrypts the message (step 944). Thereafter, the contents of the decrypted message are stored in memory 216 of the local host 220 (step 948). Of course, the contents of the message may have also been stored in the log file 552 of the credential 216 prior to transmission of the message.

The local host 220 then sends a control signal to the access control device 312 causing the access control device 312 to act in accordance with the access decision made by the credential 216 (step 952). In other words, if the credential 216 decided that access should be granted, then the access control device 312 is manipulated such that access to the asset protected by the local host 220 can be obtained. However, if the credential 216 decided that access should be denied, then the access control device 312 is manipulated or left alone such that access to the asset is denied.

In accordance with other embodiments of the present invention, the credential 216 may have access to a positioning satellite signal. In such an embodiment, the credential 216 can infer what local host 220 it is talking to based on its known position. This eliminates the requirement of the local host 220 providing a local host ID to the credential 216. The satellite may also provide the current time to the credential 216 such that the credential 216 could make an access decision without receiving any information from the local host 220. Mutual authentication and an access decision message transmission from the credential 216 to the local host 220 would be the only communications required between the credential 216 and the local host 220.

In other alternative embodiments, the application data is protected with a public-key cryptography using an asymmetric key Ka unique to a particular application. The key Ka would be shared with the privilege server 204. Alternatively, the key is a symmetric key diversified from a master key. In such a scheme, the privilege server 204 knows public information such as a User ID 524. The secret diversified key is derived from the public information using a hash or encryption algorithm with a secret master key known only to the privilege server 204. The diversified key is pre-calculated and stored on the credential 216 and calculated by the privilege server 204 during authentication.

In one embodiment, the authentication is performed on a static or rolling message exchanged between the credential 216 and the reader/writer 212 or local host 220. In another embodiment, the reader/writer 212 or local host 220 could have a random number generator that would be used to create a random message to use in the authentication.

In another embodiment, the user ID 524 assigned for a particular application is replaced with the credential ID 504, which could be read and cross-referenced with the user information for the purpose of assigning privileges.

In another embodiment, the reader/writer 212 or local host 220 could also be equipped with a secondary authentication device that requires a personal identification number (PIN). Either the credential 216 would read the PIN and compare it with a stored value as part of the access decision or the credential would transmit its stored value to the reader so that the reader could compare PIN values as part of the access decision.

In still another embodiment, biometric identification information can be stored on the credential and compared to a live scan biometric identification obtained either by the credential or transmitted from an external scanner. The credential 216 performs a match between the stored and live scan biometric data and uses the positive or negative comparison as part of the access decision. Alternatively, authentication is performed using a session key transported to the local host 220 by the credential 216 using a Kerberos scheme.

In accordance with one embodiment of the present invention, the control schedule 532 uses an area control scheme requiring the credential 216 to track its recent usage history. In an area control scheme a pair of area numbers is associated with the local host 220. For example, each local host 220 is a portal permitting egress from one area, and ingress to another area. This area control information is written to the credential 216 by the validation server 208 and may be in the form of last area entered and/or a timestamp from the access granting event to the last area entered.

In yet another embodiment where the local host 220 does not have access to a clock, the application data may contain a counter that permits a specified number of accesses with a given local host ID 586. The number is counted down each time that access is given for local host ID 586 and the permission is denied after the counter reaches a lower limit, such as zero. Alternatively, the credential 216 may be set to expire by means of a decay constant. The decay constant could be electric charge leaving a capacitor or battery, magnetic field, or other means that can be detected and reset.

In still another embodiment, the application data is stored on the credential 216 in a structured order, for example a door list in column 1, a two-man-rule name list in column 2, and other information in column 3 and so on. Then a filter that is coded to read data from a given column/row on the credential 216 may be stored on the local host 220. This template contains no other information other than which row and column to read from a credential 216. This template can be stored on the local host 220 memory 316. In use for decision-on-card, the template will be read by the credential 216 and the identified information will be used in making the access decision.

As can be appreciated by one skilled in the art, additional applications may be employed using a credential 216 that is capable of making its own access decisions. In one embodiment, the credential 216 may be used for loyalty programs that, for example, offer a free or discounted product or service after a prescribed number of products or services have been purchased.

Two-Man-Rule on Reader

The two-man-rule controls access to sensitive areas where a minimum of two people are required at all times. Most of the logic is contained in the reader/writer 212 or local host 220. The access control device 312 is normally locked and two valid credentials 216 are presented for entry. Either two readers can be used to ensure near simultaneity or a single reader can be used to read two credentials 216 in temporally close succession. The reader notes that two valid credentials 216 have been read and then once the access control device 312, such as a door, has been opened and closed, a reader on the opposite side of the door must again read the same two credentials 216 to ensure that both users entered. Once two users are in the secure area, additional valid users are allowed access. Exiting the secure area follows the same procedure in reverse where the last two people must exit together or where no single individual is permitted to remain in the searched area. Any violation of the procedure will set off an alarm. Log files may be kept on both the reader and the credentials 216. The information stored on the credential 216 can include the identification of other credentials 216 used to enter the room during the same time period. This method requires that the reader has a way of detecting that the door or similar access control device 312 has been closed and locked.

Two-Man-Rule on Credential

An alternative approach is to put the two-man-rule on the credential 216. In one embodiment, two valid credentials 216 are presented to an outside reader. The credential 216 recognizes that the reader uses two-man-rule and the reader has to cooperate with the credentials 216 by providing information to the second credential 216 that a valid first credential 216 has just been read. The reader can be programmed to use the two-man-rule by transmitting the timestamp of the most recently read valid credential 216 and by having the ability to interpret two different control commands from the credential 216. One possible control command is that the credential 216 is valid but without the command to unlock the door. This occurs when a credential 216 verifies that it is valid, but that the timestamp received from the reader of the most recent valid credential 216 is too old (for example more than five seconds). The second control command, for example, is to unlock the access control device 312. This occurs when the credential 312 verifies that it is valid and that the timestamp from the most recently read valid credential 312 is within the allowed time period defined in the two-man-rule. An example two-man-rule is shown as follows:

1) The first valid credential 216 sends a message to the reader that it is valid and the reader does not immediately unlock the door but instead waits for a second valid credential 216.

2) The second credential 216 receives information from the reader a first credential 216 has just been validated.

3) The second credential 216 has information that this door uses two-man-rule and should, after receiving information about the first valid credential 216, check its own validity with a positive check resulting in the credential 216 sending a control command for the access control device 312 to be unlocked or released.

Man-Trap

A man-trap provides security against piggybacking. The configuration requires two doors on either side of a vestibule area and each door having a reader on both the inside and outside of the area. Both doors are normally locked and are generally unlocked in a specified order. Normal operation requires that readers on both doors are able to detect if either of the other doors are closed and locked or open. In normal operation, a credential 216 is presented to a first reader outside the enclosed area on or near the first door. A valid credential 216 will unlock this first door allowing the person to enter the vestibule. The first door closes and locks before the second door can be unlocked. After the first door is closed and locked the credential 216 can be presented to the second door and, if valid, the second door will unlock.

Pseudo Man Trap

A pseudo-man-trap can be implemented on non-networked readers. With non-networked readers, the second door is unaware of whether or not the first door is closed and locked or is open; therefore, it cannot be required to remain locked while the first door is open or unlocked (this may be overcome by a local wired or wireless network). Similar results can be obtained by using the credential 216 to carry a message from the first door to the second door regarding its lock-status. The operation of a pseudo-man-trap is described as follows:

1) The credential 216 is presented to the outside reader of the first door and if valid the door is unlocked.

2) After entering the enclosure and waiting for the door to close and lock, the credential 216 is presented to the inside reader of the first door. The card receives a secure message, possibly using a key shared by the two doors, stating that the first door is closed and locked.

3) The credential 216 is presented to the second door and both the credential 216 validation and the first-door-status are checked. If both conditions are satisfied the second door is unlocked.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    presenting a credential to a reader, said reader associated with an access control system;
    said reader transmitting data comprising at least one of a host identifier and timestamp to said credential;
    said credential analyzing the at least one of a host identifier and timestamp using an application stored on said credential;
    said credential making an access control decision for itself, the access control decision comprising a determination as to whether or not the credential is allowed access to an asset protected by said reader, and the access control decision being based on said analyzing step;
    said credential generating a message containing results of said access control decision; and
    said credential sending said message to said reader.

2. The method of claim 1, further comprising:
    receiving a reply message from said reader at said credential.

3. The method of claim 1, wherein said access control decision comprises a grant of access to the asset protected by said reader, the method further comprising:
    said reader transmitting results of said access control decision to an access controller; and
    said access controller allowing a user of said credential access to said asset.

4. The method of claim 3, wherein said access controller comprises at least one of a lock for an individual door, a lock for a computer system, a lock for a computer, and a lock for a database.

5. The method of claim 1, wherein said access controller comprises at least one of a lock for an individual door, a lock for a computer system, a lock for a computer, and a lock for a database.

6. The method of claim 1, wherein said access control decision comprises a denial of access to an asset associated with said access control system, the method further comprising:
    said access controller denying a user of said credential access to said asset; and
    said reader saving said message received from said credential in a log.

7. The method of claim 1, wherein said message is encrypted prior to being sent from said credential to said reader.

8. The method of claim 1, wherein said analyzing step is performed using an authentication key that is shared between said credential and said reader.

9. The method of claim 1, wherein said reader is a non-networked reader.

10. The method of claim 1, further comprising performing authentication between said reader and said credential prior to said reader transmitting data.

11. The method of claim 1, further comprising:
    presenting said credential to a reader that is in communication with a validation server;
    said credential sending user information to said validation server;
    said validation server checking a status of said user information; and
    said validation server performing one of the following:

(i) in the event that said status is active, said validation server updating an expiration of said user information and sending said updated user information back to said credential;

(ii) in the event that said status is inactive, said validation server noting said credential as invalid and setting said user information as expired; and (iii) in the event that said status is active, said validation server doing nothing.

12. The method of claim 1, further comprising updating said application on said credential to reflect current access permissions of said credential.

13. The method of claim 12, wherein a privilege server associated with the access control system performs said update.

14. The method of claim 1, wherein said credential comprises at least one of a smartcard, proximity card, passport, key fob, cellular phone, portable computer, and Personal Digital Assistant (PDA).

15. An access control system, comprising:
at least one local host for controlling access to an asset; and
at least one credential comprising:
a memory for storing an access decision application that is capable of making an access decision for said credential based on data received from the at least one local host, the access control decision comprising a determination as to whether or not the credential is allowed access to the asset protected by said at least one local host; and
a processor for executing said access decision application in connection with said received data, wherein said processor is further capable of generating a message after executing said access decision application and causing said message to be transmitted to the at least one local host, and wherein said message comprises results of said access decision for said credential.

16. The system of claim 15, wherein said received data comprises a local host identifier assigned to the at least one local host.

17. The system of claim 15, wherein said received data comprises at least one of authentication information and a timestamp.

18. The system of claim 15, wherein the at least one local host comprises:
a reader for communicating with the at least one credential; and
an access control device in communication with said reader, wherein results of said access decision received at said reader are transmitted to said access control device for performance by the access control device consistent with said access decision.

19. The system of claim 18, wherein said reader comprises at least one of a Radio Frequency Identification (RFID) reader, a magnetic reader, an optical reader, and a contact electrical reader.

20. The system of claim 15, wherein the at least one credential comprises at least one of a contact smartcard, a contactless smartcard, a proximity card, passport, a key fob, a cellular phone, portable computer, and a Personal Digital Assistant (PDA).

21. The system of claim 15, wherein said memory comprises a nonvolatile memory.

22. The system of claim 15, wherein said access control application comprises at least one data structure at least partially defining access privileges of a user of the at least one credential.

23. The system of claim 15, wherein historical data related to communications with local hosts is stored on said memory of the at least one credential.

24. The system of claim 23, wherein said historical data is used in connection with said access control application to make an access decision.

25. The system of claim 15, wherein the at least one local host directly communicates with only the at least one credential for purposes of making the access decision, but not for all purposes.

26. The system of claim 15, further comprising a validation server for maintaining expiration times of said access decision application stored on the at least one credential.

27. The system of claim 15, further comprising a privilege server capable of updating said access decision application.

28. The system of claim 15, wherein the at least one local host comprises multiple non-networked readers updated by one or more credentials as interactions occur between the one or more credentials and the multiple non-networked readers.

29. The system of claim 15, further comprising a server operable to maintain expiration times of said access decision application stored on the at least one credential and further operable to update said access decision application.

30. A credential for use in a secure access system, comprising:
a memory for storing an access decision application that is capable of making an access decision for said credential based on data received from a local host, the access control decision comprising a determination as to whether or not the credential is allowed access to an asset protected by the local host; and
a processor for executing said access decision application in connection with said received data, wherein said processor is further capable of generating a message after executing said access decision application and causing said message to be transmitted to the local host, and wherein said message comprises results of said access decision for said credential.

31. The credential of claim 30, wherein said received data comprises a local host identifier assigned to said local host.

32. The credential of claim 31, wherein said received data comprises at least one of a random number, key and timestamp.

33. The credential of claim 31, wherein the credential comprises at least one of a contact smartcard, a contactless smartcard, a proximity card, passport, a key fob, a cellular phone, portable computer, and a Personal Digital Assistant (PDA).

34. The credential of claim 31, wherein said memory comprises a nonvolatile memory.

35. The credential of claim 31, wherein said access control application comprises at least one data structure at least partially defining access privileges of a user of said credential.

36. The credential of claim 31, wherein said credential conveys data to said local host that updates said local host.

* * * * *

UNITED STATES PATENT AND TRADEMARK OFFICE
CERTIFICATE OF CORRECTION

| | |
|---|---|
| PATENT NO. | : 8,074,271 B2 |
| APPLICATION NO. | : 11/778145 |
| DATED | : December 6, 2011 |
| INVENTOR(S) | : Michael L. Davis et al. |

It is certified that error appears in the above-identified patent and that said Letters Patent is hereby corrected as shown below:

In the Claims:

Column 18, lines 37-40:

DELETE "wherein said access controller comprises at least one of a lock for an individual door, a lock for a computer system, a lock for a computer, and a lock for a database" and INSERT -- further comprising said reader saving said message received from said credential in a communications log --

Signed and Sealed this
Twenty-fourth Day of September, 2013

Teresa Stanek Rea
*Deputy Director of the United States Patent and Trademark Office*